May 3, 1960     D. BRAUN     2,935,158
DUST FILTER
Filed Feb. 16, 1959
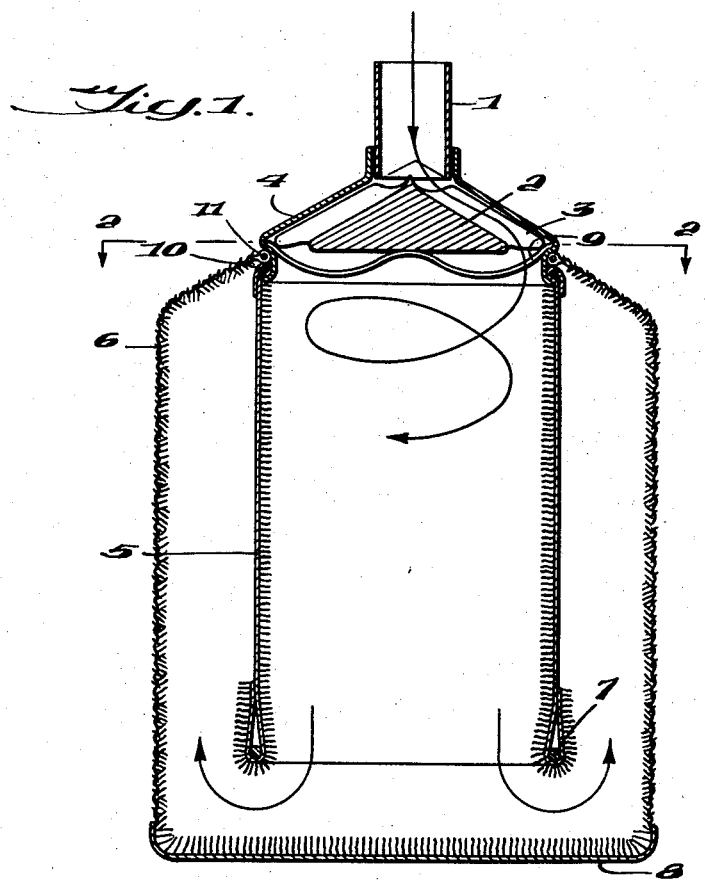
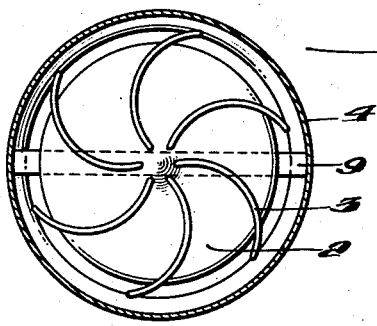
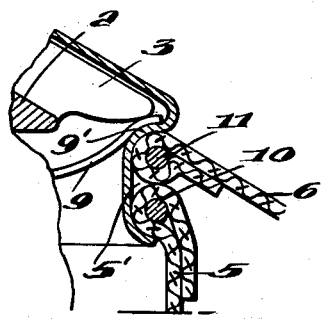
INVENTOR
Dieter Braun
BY Bailey, Stephens & Huettig
ATTORNEYS

United States Patent Office 2,935,158
Patented May 3, 1960

2,935,158

DUST FILTER

Dieter Braun, Stuttgart-Bad Cannstatt, Germany, assignor to Fortuna-Werke Spezialmaschinenfabrik A.-G., Stuttgart-Bad Cannstatt, Germany Application February 16, 1959, Serial No. 793,559

Claims priority, application Germany February 14, 1958

16 Claims. (Cl. 183—67)

The invention relates to filters for entrapping dust as well as larger particles, and more particularly to such filters for use in machines which produce chips and smaller pieces of wood, leather or the like. It is directed especially to a dust filter with a whirling chamber for the separation of non-metallic chips and fine dust particles of a size of 5 sq. mm. and smaller which are collected in the suction apparatus of processing machines, such as are used in the wood, leather and shoe industries.

There is a definite need for dust filters of this type, suitable for collecting large quantities of chips and fine dust with a high filtering efficiency, in which the open cross section of the filter required for ample air flow does not decrease substantially during use.

Dust filters of different types are known, with the dust bags or pockets arranged either singly or one inside the other, or of complicated design, in which the dust is removed either manually or by automatic devices. Many plain dust bags are found to clog up rather quickly, making it necessary to empty them relatively often in order to reestablish the required open cross section for adequate suction, others are too large and do not fit in the relatively limited space in the machine stand usually provided for that purpose. While mechanical dust removing devices permit longer, and, in some cases, uninterrupted suction, devices of this type are very expensive and, in addition, quite large and cumbersome and usually cannot be arranged in a machine stand.

Furthermore, separators are known which have whirling chambers in which the air-dust mixture is given a whirling motion by special whirl generating means which, by centrifugal force, fling the dust particles towards the wall of the whirling chamber. It was formerly usual to make the walls of the whirling chambers as smooth as possible so as not to slow down the whirling motion and to facilitate the settling of the dust particles flung against the wall. If, at the bottom of the whirling chamber walls, the air jet happens to be directed towards the top of the wall, the up-streaming air crosses the veil of dust particles settling along the whirling chamber wall and thus tends to carry along dust particles which have already been separated. These dust particles are likely to be retained in the last filter cloth and will clog it prematurely.

The primary purpose of the present invention is to provide a dust filter which overcomes the disadvantages of the prior art.

Another object of the invention is to provide a dust filter small enough to be arranged in a machine stand which is capable of use over long periods of time without being emptied or requiring special attention.

Another object of the invention is to provide a dust filter of this type which is simple and inexpensive in construction.

According to the invention, the wall of the whirling chamber is deliberately kept rough to permit the dust particles flung against it to adhere to the wall surface instead of sinking down. If, according to the invention, the wall of the whirling chamber is coated with a plushlike fabric, with the plush hairs directed towards the interior, the centrifugal force of the whirling motion will in effect force the dust particles between the plush hairs where they are held securely. An additional advantage lies in the fact that the whirling motion in the zone close to the chamber wall will be slowed down so much as to be relatively insignificant at the bottom of the whirling chamber so that any particles which sink down will be retained on the bottom of the filter bag, which is also rough, and will not be picked up and carried along with the air stream. Any dust particles once separated will remain separated.

The design of the dust filter described herein makes it possible to use a dust filter which does not have any mechanical dust removing device. For a whole week on the average, of 8 working hours daily, without any diminishing of the suction efficiency of the blower such as is usually caused by the clogging of the cross-sectional area of the filter, thus making it necessary to clean the filter.

An important feature of the invention is found in the use of impeller of known design, rigidly fitted and held by a leaf spring in the entry zone of the filter, and provided with curved guide vanes. This impeller imparts to the dust-laden air entering the filter at high velocity a rapid rotational motion in the form of a whirl which gradually travels downward. Immediately below the impeller there is a tube-like whirl chamber consisting of a tube of plush-like fabric which is open at the lower end and, according to the invention, serves as a dust collector. The hairy side of this fabric is directed towards the interior of the dust collector. All large chips and medium to fine dust particles will be flung out by the centrifugal force and will lodge in the long-hair plush of the inner wall of the cylinderical dust collector, while the finest dust particles will be removed in a later filtering step. The lower end of this dust collector is loaded down in a known manner so as to make the dust collector hang down vertically and to prevent it from fluttering in the whirling air, which might possibly dislodge the separated dust particles. The inner dust collector is concentrically surrounded by a filter bag closed on all sides, the filter cloth of which is close-meshed but also has fibers or hairs directed towards the interior, such as sofa plush, fine velour made from perlon, or any other fabric roughened on one side, the hairs of which, however, are somewhat shorter than those in the tube-like part of the separator. The bottom of the dust bag is also made of the cloth used for the separator tube.

As soon as the dust-laden air in the tube-like part of the separator has lost all coarse and fine dust particles (the relatively large parts will sink down to the bottom of the filter bag), the partially cleaned air will rise slowly in the larger cross-section of the ring-like outer chamber of the filter bag and will escape into the open through the meshes of the filter bag. The cross sectional area at the lower end of the inner dust collector will thus remain open in spite of the passage of a constant stream of heavily dust-laden air. No air will penetrate through the cloth of the inner filter tube. The cleaning intervals will therefore be determined by the outer, large filter bag alone which only has to retain the finest dust particles and therefore can be used quite a long time before cleaning. The fine fibres or hairs of the filter bag, produced by roughening the inner side of a suitable fabric, or by any other method, increase the dust retaining capacity which is found to be considerably higher than that of a filter cloth which is smoothly woven. The dust particles can adhere to the long fibers or hairs without clogging the pores of the filter cloth. It is evident that such a velour filter cloth can collect larger quantities of dust than a normal filter cloth and still remain penetrable by air for a much longer time.

The new dust filter can therefore be made considerably smaller than it was previously, without reducing its filtering capacity.

In order to clean the filter, it is sufficient to remove the outer dust bag and to shake it out by hand. The inner dust collector can also be cleaned by hand, but without removing it. If any large waste particles have lodged in the impeller, the impeller wheel can be easily removed and cleaned after removing the inner dust collector and the leaf spring.

Further objects and advantages of the invention will appear more fully from the following description especially when taken in conjunction with the accompanying drawings, which form a part thereof.

In the drawing:

Fig. 1 shows in vertical cross-section a separator embodying the invention.

Fig. 2 is a cross-section substantially on the line 2—2 of Fig. 1; and

Fig. 3 is an enlarged view of a detail of Fig. 1.

In the arrangement shown, 1 is the entry pipe which is connected to a part of the machine where dust and chips are produced. A suction is applied on the outside of the device in a manner known in the art.

Immediately below the entry pipe 1 there is a rigidly arranged impeller 2 with curved vanes 3, held by leaf spring 9, the ends of which overlie a shoulder 9' formed on the inside of conical extension 4 of the pipe 1. Fastened to the conical covering plate 4 are both inner dust collector 5 and outer filter bag 6. The inner dust collector and the outer filter bag are held in place by rubber bands 10 and 11 engaging in an outwardly opening groove 5' in the downward extension of conical cover 4 and can be easily removed. The lower end of tube 5 is loaded down at 7 with a suitable weight, such as a metal ring. The bottom 8 is formed of the same filter cloth as is used for the inner dust collector. The distance between the lower end of tube 5 and bottom 8 is approximately the same as the distance between the tube-like part and the wall of the outer filter bag.

As is explained above, the inner filter bag 5 and the bottom 8 are of plush or some other material having relatively long hairs, while the filter bag 6 is preferably made of a material which is roughened so as to form a nap on its surface or of a relatively short-napped cloth which is previous to air.

It will be noted that this dust filter is of extremely simple design and can therefore be cheaply made and easily serviced; no more servicing is required than a regular cleaning at periods of one week. It can be used as a dust separator for groups of similar machines and also, because of its small dimensions, as a single unit arranged in the machine stand of a processing machine. The efficiency is high and remains practically unchanged for the whole duration of its service. The same applies to the energy requirements of the blower. This results from the fact that most of the dust settles in the hairs of the inner dust collector so that the wall of the outer filter bag will not clog as much as might be expected in filters of the usual design. The pressure loss increases at a slower rate, and the sucking efficiency of the blower decreases more slowly than in conventional filter units of about equal dimensions.

While I have described herein one embodiment of my invention, I wish it to be understood that I do not intend to limit myself thereby except within the scope of the claims hereto or hereinafter appended.

I claim:

1. A dust filter comprising an entrance pipe, a bag of air-pervious material depending from said pipe and having a side wall and a bottom wall, a tube depending from said pipe inside and spaced inwardly from the side wall of said bag and having its open lower end spaced upwardly from the bottom wall thereof, and means associated with said entrance pipe to guide air into the upper part of said tube and to impart a swirling motion thereto, said tube being formed of a fabric having a relatively long nap on its inner face.

2. A dust filter as claimed in claim 1 in which the bottom wall of the bag is formed of a fabrric having a relatively long nap on its inner face.

3. A dust filter as claimed in claim 2, in which the side wall of the bag is formed of a fabric having a roughened inner surface.

4. A dust filter as claimed in claim 2, in which the side wall of the bag is formed of a fabric having relatively short hairs on its inner surface.

5. A dust filter as claimed in claim 1, in which the side wall of the bag is formed of a fabric having relatively short hairs on its inner surface.

6. A dust filter as claimed in claim 1, having weight means connected with the lower end of the tube to hold it down.

7. A dust filter as claimed in claim 1, in which the tube is concentric with the bag.

8. A dust filter as claimed in claim 1, in which the tube is concentric with the bag and the distance between the lower end of the tube and the bottom wall of the bag is substantially equal to the distance between the wall of the tube and the side wall of the bag.

9. A dust filter comprising an entrance pipe having a conical downward outward extension, a plate connected with said extension and located below the entrance pipe, said plate having curved vanes on its upper side to impart a swirling motion to air entering the pipe, a bag of air-pervious material depending from said pipe and having a side wall and a bottom wall, a tube depending from said extension inside and spaced inwardly from the side wall of said bag and having its open lower end spaced upwardly from the bottom wall thereof, said tube being formed of a fabric having a relatively long nap on its inner face.

10. A dust filter as claimed in claim 9, in which said extension has an outwardly open groove at its outer edge, and said bag and tube have elastic bands in their upper edges engaged in said groove.

11. A dust filter as claimed in claim 9, having weight means connected with the lower end of the tube to hold it down.

12. A dust filter as claimed in claim 11, in which said weight means is a metal ring secured to the lower edge of the tube.

13. A dust filter as claimed in claim 9, in which the tube is concentric with the bag.

14. A dust filter as claimed in claim 9, in which the tube is concentric with the bag and the distance between the lower end of the tube and the bottom wall of the bag is substantially equal to the distance between the wall of the tube and the side wall of the bag.

15. A dust filter as claimed in claim 14, in which the bottom wall of the bag is formed of a fabric having a relatively long nap on its inner face.

16. A dust filter as claimed in claim 15, in which the side wall of the bag is formed of a fabric having relatively short hairs on its inner surface.

References Cited in the file of this patent

UNITED STATES PATENTS

| | | |
|---|---|---|
| 956,862 | Meyer | May 3, 1910 |
| 1,109,372 | Thurman | Sept. 1, 1914 |
| 2,068,332 | Kneisley | Jan. 19, 1937 |
| 2,232,913 | Heuberger | Feb. 25, 1941 |
| 2,580,648 | Blair et al. | Jan. 1, 1952 |
| 2,684,125 | Brace | July 20, 1954 |

FOREIGN PATENTS

| | | |
|---|---|---|
| 572,394 | Great Britain | Oct. 5, 1945 |
| 737,457 | Great Britain | Sept. 28, 1955 |